United States Patent [19]

Torwegge et al.

[11] 4,147,192
[45] Apr. 3, 1979

[54] MACHINE TOOL FOR WOOD, PLASTICS OR THE LIKE

[75] Inventors: Helmut Torwegge, Bad Oeynhausen; Rolf Steckstor, Löhne, both of Fed. Rep. of Germany

[73] Assignee: Fa. Franz Torwegge, Bad Oeynhausen, Fed. Rep. of Germany

[21] Appl. No.: 779,911

[22] Filed: Mar. 21, 1977

[51] Int. Cl.² .................... B27C 1/14; B27G 21/00
[52] U.S. Cl. .................... 144/251 R; 181/205; 83/478; 83/397.1; 83/860; 144/242 R; 83/701
[58] Field of Search .................. 144/242 R, 251 R; 81/201, 205; 83/701, 860, 478, 397.1

[56] References Cited

U.S. PATENT DOCUMENTS

| | | | |
|---|---|---|---|
| 982,105 | 1/1911 | Thomas | 144/251 R |
| 1,590,183 | 6/1926 | Crane | 144/251 R |
| 3,824,890 | 7/1974 | Zettler et al. | 144/251 R |
| 3,860,085 | 1/1975 | Gilbert et al. | 181/205 |
| 4,036,000 | 7/1977 | Greive | 181/205 |

*Primary Examiner*—Donald R. Schran

*Attorney, Agent, or Firm*—Lawrence E. Laubscher

[57] ABSTRACT

A machine tool for machining workpieces formed of wood, synthetic plastic materials and the like is disclosed, including a transport device mounted on a frame for transporting the workpiece relative to at least one laterally arranged workpiece, and a sound damping cover unit arranged laterally of the tool for partially surrounding the round radiating region of the tool or the workpiece, characterized in that the sound damping cover unit includes a plurality of pivotally connected sound damping members that are displaceable between retracted position and extended positions above and/or below the plane of movement of the workpiece. One end of the damping cover unit is connected with a supporting frame that contains a receiving space for receiving the damping cover unit when in the retracted position. When in the extended position, the free end of the sound dampening cover unit extends above and/or below the workpiece and terminates adjacent the free end of a corresponding sound damping cover unit connected with the opposite side of the machine frame.

2 Claims, 6 Drawing Figures

MACHINE TOOL FOR WOOD, PLASTICS OR THE LIKE

BRIEF DESCRIPTION OF THE PRIOR ART

The present invention relates to a machine tool for working wood, plastics or the like, especially in the form of plate-like workpieces.

It is known to provide such machine tools with a transport means which are mounted on a machine frame, at least on one side, in the path of movement of the workpiece and provide the workpieces passing through the machine with a support. One or more working tools which work the workpieces passing through the machine, are arranged transversely with respect to the said transport means. Furthermore, it is known to surmount the sound radiating region of the tool or of the workpiece passing through the machine, laterally of the tool or tools, by means of a covering so as to damp the noise emanating from the tools or workpieces.

SUMMARY OF THE INVENTION

It is an object of the invention to provide a machine tool of that kind with a device which provides the machine with a noiseless and thus environmentally pleasant method of operation. This method of operation is achieved by simple and more effective devices which also produce good sound damping with workpieces of different sizes.

This problem in a machine tool of the above kind is solved in accordance with the invention in that a reciprocable sound damping unit formed from acoustic members pivotally connected to one another is mounted near the tool in its sound radiating region above and/or below the plane of movement of the workpiece, as a covering, one end of which is mounted in the region of the transport device in a receiving space accommodating the pivotally interconnected acoustic members in their retracted state and the free end of which extends in an overlapping manner over the sound radiating region of the workpieces passing through the machine on one and/or both sides, with adjacent acoustic members in the extended condition of the sound damping unit.

In so doing, it is preferred that the acoustic members are arranged in a row adjacent one another, movable on top of one another and in a superposed manner, as a stack movable into the receiving space.

In a preferred manner, each sound damping unit is made up of two, three, four or more members in the form of blocks, chunks, strips or other sections of a single or multi-layer sound damping material and the said members are made movable (pivotable, tiltable) with respect to each other by means of levers, hinges, links or other flexible connecting means and are made pivotable or displaceable with respect to the space accommodating them.

Above the plane of movement of the workpiece, the receiving space for each sound damping unit is formed by the supporting frame of a hold-down arrangement and below the plane of movement of the workpiece, a respective side portion of the machine frame or of the supporting frame for the advancing chains, forms the receiving space. The machine has two side portions movable with respect to each other and hold-down arrangements movable with respect to each other corresponding to the said side portions and each side portion and each hold-down arrangement has receiving spaces into and out of which the sound damping elements can be moved and corresponding to the number of working tools.

The degree of outward movement of the elements corresponds to the width of the workpieces to be treated, which also establishes the distance of the hold-down arrangements and side portions from each other, which, however, need not be larger than about 250 to 300 mm.

The outwardly moved sound damping members are fixed in position slightly spaced from the surface of the workpiece by their moving means as well as by mutual arrangement.

In a more simple, more positive and cost saving manner, the machine in accordance with the invention has a noiseless and thus an environmentally pleasant mode of working, by the fact that a sound damping unit which covers the radiation region of the workpiece and which damps sound occurring during operation is arranged in the region of each tool (chip removing tool) so that a completely noiseless operation is carried out.

The sound damping means can either be moved into the sound radiating region manually by the operator or automatically. As is known, the sound radiating region is the area which is included in the semi-circle having a radius of about 30 cm above the upper surface of the workpiece and about the working point. If the said region of the workpiece is covered by the sound damping unit, the development of noise radiating therefrom is greatly reduced.

Moreover, the acoustic members are movable into an associated receiving space and are thus removable partially or completely out of the region of the workpiece so that their effective size can be adapted to different widths of workpiece.

BRIEF DESCRIPTION OF THE DRAWING

Embodiments in accordance with the invention will be subsequently described in more detail with the aid of the drawings, in which.

DETAILED DESCRIPTION

Figure 1:
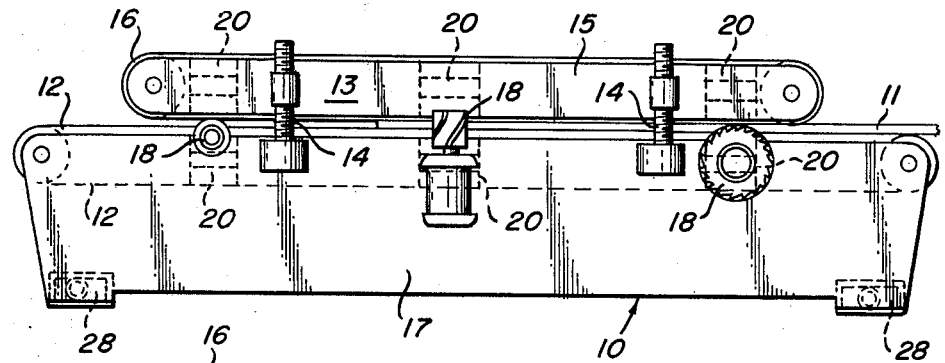
FIG. 1 is a side view of a wood working machine comprising working tools and sound damping units, FIG. 2 an end view in partial section of the same machine comprising a sound damping unit covering a workpiece.

A machine frame of a wood working machine is referenced 10 on which is mounted a transport device 12 formed by an endless circulating transport belt, chain conveyor or rollers, and forming a support for the workpieces 11 to be treated. This transport device 12 forms a through passage through passage for the workpiece 11 lying in an horizontal plane. A hold-down arrangement 13 is provided above the said transport device 12, which arrangement is formed by a supporting frame 15 adjustable in height with respect to the transport device 12 by adjustment means 14 such as threaded rods, and an endless transport belt 16, transport chain or rollers circulating therearound; this hold-down arrangement 13 presses the workpiece 11 on to the transport device 12 and at the same time forms an advancing means together with the transport device.

In a preferred manner, the machine frame 10 has two side portions 17 each with a transport device 12 and the distance of one of the said side portions 17 from the other side portion 17 is adjustable by means of guides 28.

Above each transport device 12, there is mounted a hold-down arrangement 13, the distance of one of which from the other is adjustable corresponding to the side portions 17 so that a side portion 17 and a hold-down arrangement 13 are always superposed.

At least one working tool 18, such as a cutter, miller, saw, grinder or the like, preferably a number are arranged at intervals behind one another in the direction of advance of the workpiece, are mounted on the side portions 17 and/or the hold-down arrangements 13, which continually operate on the marginal regions of the workpiece 11 passing between the transport belts 12, 16, so as to groove, cut to size, grind, chamfer or the like.

In the region of the or each working tool 18 there is arranged above and/or below the plane of movement of the workpiece, a sound damping unit 20 formed from at least one or from a number movably connected to one another of sound damping members 19 lying at a distance from the top or the bottom surface of the workpiece 11a, which sound damping unit damps noise radiated from the workpiece 11 and thus guarantees a noiseless operation. Each sound damping unit 20 is provided in a receiving space 21 associated therewith and at least partially movable thereinto.

The receiving space 21 for the sound damping unit 20 arranged above the workpiece 11 is formed by the supporting frame 15, the receiving space 21 for the sound damping unit 20 provided below the workpiece 11, is formed by the side portions 17 and all the receiving spaces 21 are open towards the centre of the workpiece, thus are open towards each other and are closed towards the outside (towards the tools 18). For example, the hold-down supporting frame 15 and each of the side portions 17 for forming the receiving spaces 21, has a C-shaped cross-section (a box-shape standing on its edge).

Each sound damping unit 20 is composed, for example, of three or more sound damping members 19 pivotally connected to each other, which are preferably of block, strip or chunk shape. Each sound damping member 19 is formed from a sound damping material, for example from a multi-layer plate, and has an angular, such as rectangular, cross-sectional shape or is made as a section.

The sound damping unit 20 is preferably positioned at a slight distance from the surface of the workpiece and covers the sound radiating region. In this way, sound radiating from the workpiece 11 is damped and a sound damping effect occurs due to the narrow gap 20a thus existing between the workpiece 11 and the sound damping unit 20, especially when the layer 19a directed away from the workpiece 11 is a sound absorbing layer.

Figure 2:
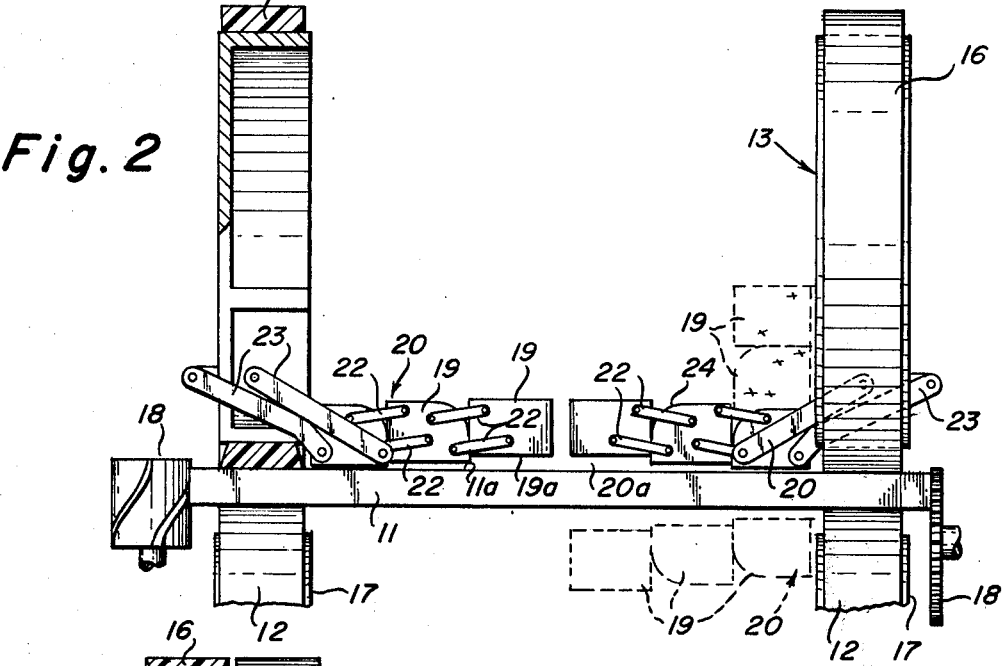
Figure 3:
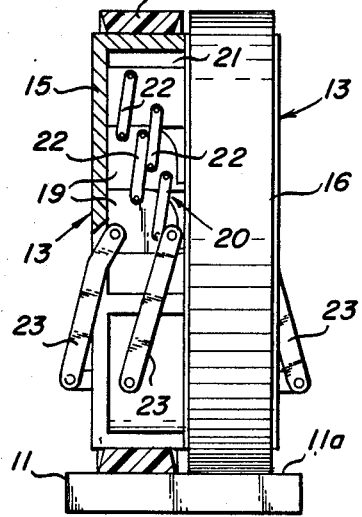
FIG. 3 is an end view in partial section of the sound damping units retracted into the receiving spaces.

In accordance with the embodiment of FIGS. 2 and 3, each tool 18 is associated with three sound damping members 19, pivotally connected to each other by levers 22, which are pivotally mounted as a unit 20 to the supporting frame 15 or to the side portions 17 respectively by further levers 23.

Each of the three sound damping elements 19 are made vertically pivotable and pivotable on one another by parallel levers (linkages) 22 and the element 19 adjacent to the supporting frame 15 or side portion 17 is pivotally connected to the supporting frame 15 or side portion 17 by parallel levers 23.

In the position of each sound damping unit 20 fully pivoted out of the receiving space 21, the sound damping members 19 lie in rows towards the centre of the workpiece and at a slight distance above or below the surface 11a of the workpiece so that the workpiece 11 can pass through between the sound damping units 20 without any frictional contact. Stabilization of the position of the sound damping members 19 is achieved by the parallel levers 22, 23 and by their mutual co-operation. The two members 19 adjacent to the supporting frame 15 or side portions 17 each have for the purpose of pivoting, each have a rounding off and/or chamfer 24 facing the adjacent member 19 and facing away from the surface 11a of the workpiece, only the free (final) member 19 is formed without such a corner formation. According to the widths of the workpiece 11 and thus according to the distance between the side portions 17 and the hold-down arrangement 13, all or only some members 19, are swung out of the receiving space 21 and near to the surface 11a of the workpiece. According to FIG. 2, the workpiece 11 is of a width which permits all three members 19 of the opposite damping units 20 being swung out of the receiving space 21. On the right hand side of FIG. 2, the position is shown in dotted lines of the two outer members 19 pivoted one upon the other, so that all three members 19 are superposed and thus only a narrow region of the workpiece is influenced in a sound damping manner by the members 19.

In FIG. 3, the sound damping members 19 are pivoted one upon the other and completely swung into the receiving space 21 and the hold-down arrangements 13 are moved close to one another which, for example, is necessary when operating on a very narrow workpiece 11.

In the swung-out position the levers 23 are located in a stable position due to the mutual cooperation and support on the supporting frame 15 or side portions 17 respectively.

Figure 4:
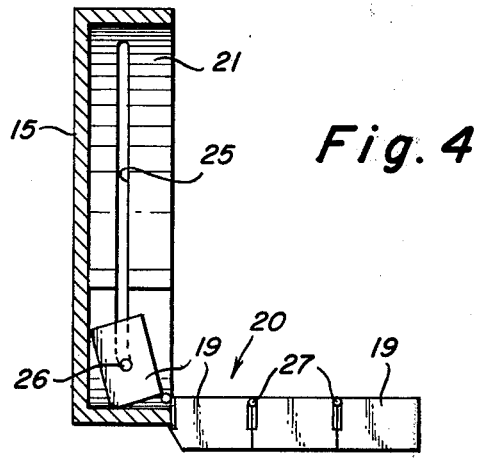
FIG. 4 is an end view in partial section of a receiving space comprising an extended sound damping unit of a modified form.

Instead of the pivotal connection between the sound damping members 19 by the levers 22, 23, a hinge connection and a displacement guide may also be provided as is illustrated in FIG. 4. In this case, the member 9 at the hold-down end or side portion end respectively is displaceably retained in a vertical guide such as a groove 25 by means of lateral guide pins 26 and the other sound damping members 19 are each made pivotable and tiltable with respect to one another and to the said guided member 19 by a hinge 27.

By a variation in height of the member 19 at the hold-down end or side portion end, the other members 19 are moved to a greater or lesser extent out of the receiving space 21 into the region of the workpiece 11 or completely retracted or extended. In so doing, the stable position of the members 19 likewise occurs once again due to the mutual co-operation and the hinges 27 are provided on the edges remote from the workpiece 11.

The movement of the members 19 can take place through a draw rope, through a threaded rod or through other suitable means. These members 19 are made so as to be movable like rollers.

The number of sound damping elements 19 in each unit 20 may be as desired or provided corresponding to the particular requirements.

In a further embodiment, the sound damping members 19 are arranged displaceable near to the surface of the workpiece 11a independently of each other by movement means, such as a draw rope, guides or the like, out of a receiving space 21 which lies above the hold-down arrangement 13 or below the side portion displacement guide 28 respectively.

Figure 5:
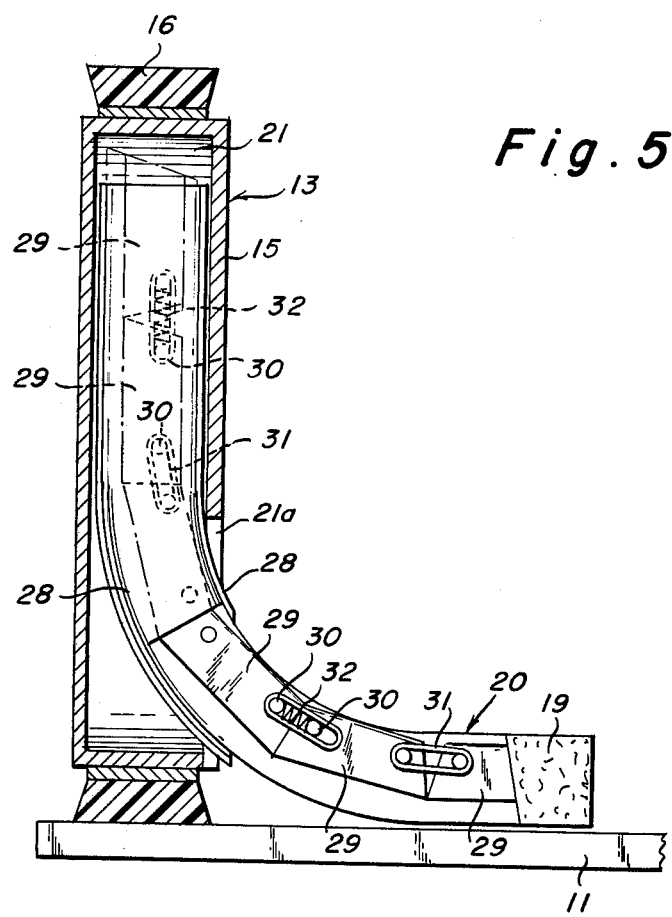
FIG. 5 is an end view in partial section of a sound damping unit extended out of the receiving space and in a further form, and FIG. 6 a sectional view taken through a sound damping unit.

In accordance with the further embodiment according to FIG. 5, the sound damping unit 20 is formed by a single flexible sound damping member 19, preferably by a mineral fibre plate or a plate of suitable sound damping material.

The supporting frame 15 forming the receiving space 21 has a rectangular cross-section standing on its edge and is closed in cross-section up to an outlet opening 21a in one long side and lying adjacent to the workpiece 11 (the long side facing the other supporting frame 15). A guide 28, through which the sound damping member 19 is introduced into the receiving space, extending in a straight line in the receiving space 21 and having a curved region slightly projecting out of the opening 21a, extends in the receiving space 21.

At both side regions or laterally within the sound damping member 19, there are arranged a plurality, preferably three, of guide plates 29 having for example a basically trapezoidal shape, and each of the two plates 29 on the two opposite sides of the sound damping member are connected together by connecting rods 30, or all the guide plates 29 each have two pins 30 — the rods 30 or pins 30 extending in the corner regions of the shorter sides of the trapezium.

Each of the central guide plates 29 is connected to the adjacent guide plate 29 by an elongate ring 31, which embraces the adjacent pins 30 or rods 30 of the two plates 29 and permits movement of the plates 29 with respect to one another.

Between the adjacent rods 30 or pins 30 of the central plate 29 and the last plate adjacent to the guide 28, there is provided a tension element 32 preferably a tension spring. Movement of the sound damping member 19 out of the receiving space 21 or into the latter may be produced manually or automatically by a draw rope or another suitable movement producing means.

During movement out of the receiving space 21, the sound damping member 19 is moved in an arcuate manner through the guide 28 and the sound damping member 19 extends at a slight distance from the workpiece 11, over or under its surface. Due to the weight of the sound damping member 19, the forward region thereof is continually changed from the arcuate shape — caused by the guide 28, into the horizontal straight shape and movement in this plane form is limited by the forward pins 30 and retaining ring 31 by abutment of the two adjacent pins 30 and cannot therefore fall on to the workpiece 11. The remaining region of the sound damping member in part retaining its arcuate shape, is stabilized in the arcuate shape by the tension spring 32, which, due to its point of engagement with the pins 30, hold the lateral plates 29 together with their inclined sides of the trapezium in engagement with one another.

The length of the sound damping member 19 moving out of the receiving space 21 can be selected in accordance with the desired width of the work and with longer members 19 more plates 29 and if necessary also more tension springs 32 are provided.

Figure 6:
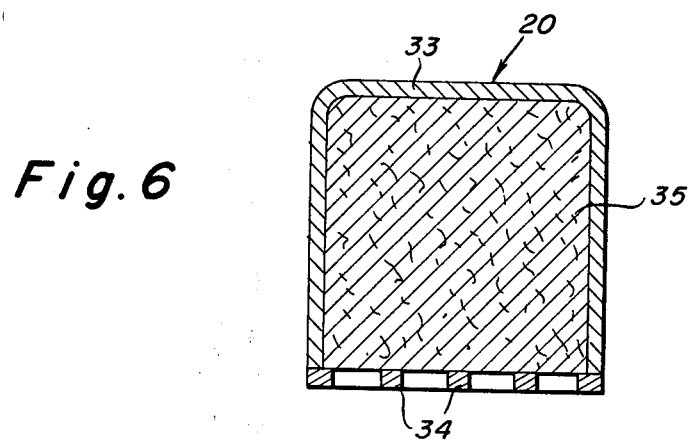

The sound damping unit 20 illustrated in FIG. 6 consists of a housing 33 somewhat rectangular in cross-section, which has a lower flat perforated plate 34. The interior of this housing 33 is filled with a wadding 35 of mineral fibres. Such a sound damping unit has very good sound damping qualities.

What is claimed is:

1. Apparatus for machining a workpiece formed of wood, synthetic plastic material or the like, comprising
   (a) a frame;
   (b) transport means for transporting the workpiece across the frame;
   (c) at least one working tool connected with said frame laterally of the path of travel of the workpiece; and
   (d) at least one sound damping cover means connected with said frame laterally of the path of travel of the workpiece, said sound damping means including
      (1) a series of sound damping members pivotally connected at their adjacent ends to define a cover unit; and
      (2) means connecting said cover unit at one end with said frame for transverse displacement between retracted and extended positions relative to the workpiece, said cover unit in the extended position extending transversely at its outer end at least partially across the sound radiating region of the workpiece adjacent the tool, said connecting means including parallel lever means for effecting pivotal movement of said cover unit to a retracted position contained in a receiving space defined within said frame, said sound damping members, when in said retracted position, being stacked in adjacent relation one on top of another.

2. Apparatus for machining a workpiece formed of wood, synthetic plastic material or the like, comprising
   (a) a frame;
   (b) transport means for transporting the workpiece across the frame;
   (c) at least one working tool connected with said frame laterally of the path of travel of the workpiece; and
   (d) at least one sound damping cover means connected with said frame laterally of the path of travel of the workpiece, said sound damping means including
      (1) a series of sound damping members pivotally connected at their adjacent ends to define a cover unit; and
      (2) parallel lever means connecting said cover unit at one end with said frame for transverse displacement between retracted and extended positions relative to the workpiece, said cover unit in the extended position extending transversely at its outer end at least partially across the sound radiating region of the workpiece adjacent the tool, said sound damping members in the extended position being stabilized by mutual cooperation and by said lever means, said cover unit in the retracted position being contained in a receiving space defined within said frame.

* * * * *